United States Patent [19]

Kodama et al.

[11] Patent Number: 4,853,735
[45] Date of Patent: Aug. 1, 1989

[54] OZONE REMOVING DEVICE

[75] Inventors: Yutaka Kodama, Tokyo; Junichi Hirasawa, Yokohama, both of Japan

[73] Assignee: Ricoh Co., Ltd., Tokyo, Japan

[21] Appl. No.: 158,340

[22] Filed: Feb. 22, 1988

[30] Foreign Application Priority Data

Feb. 21, 1987 [JP] Japan .................. 62-36884

[51] Int. Cl.$^4$ ................. G03G 15/00; B67B 7/00
[52] U.S. Cl. .................. 355/215; 220/359
[58] Field of Search ............. 355/3 R, 3 SC; 204/176; 220/359

[56] References Cited

U.S. PATENT DOCUMENTS 3,779,166 12/1973 Pressman et al. ............ 355/3 SC X
4,029,033 6/1977 Kerwin et al. ................. 220/359 X
4,124,149 11/1978 Spitzer et al. ................. 222/402.19
4,264,184 4/1981 Nishikawa et al. ............ 355/3 SC X Primary Examiner—Donald A. Griffin
Attorney, Agent, or Firm—Cooper & Dunham

[57] ABSTRACT

An ozone removing device suitable for use in an image forming apparatus using an electrophotographic process, such as a copier, a laser printer or a facsimile machine, includes a container for containing therein a quantity of a volatile ozone removing agent. Thus, the vaporized or volatilized ozone removing agent flows out of the container through its mount and diffuses into the surrounding atmosphere where it decomposes and removes the ozone when encountered. A filter formed with a plurality of through-holes is fixedly attached to the mouth of the container so that the rate of volatilization of the volatile ozone removing agent is properly controlled, to thereby provide a prolonged ozone removing action. Preferably, a seal is adhesively and sealingly attached to the filter to normally keep the through-holes closed. The seal is removed at least partly to set one or more of the through-holes open after placing the present ozone removing device in position.

15 Claims, 3 Drawing Sheets

OZONE REMOVING DEVICE

BACKGROUND OF THE INVENTION

1. Field of the Invention

This invention generally relates to a device for removing ozone in a predetermined space, and in particular to an ozone removing device suitable for use in such apparatuses as electrophototraphic copiers, laser printers and facsimile machines.

2. Description of the Prior Art

In various image forming apparatuses using an electrophotographic process, such as copiers, laser printers and facsimile machines, use is typically made of a corona discharge unit for emitting corona ions as a charging unit for charging a photosensitive member uniformly and also as an image transfer unit for transferring a toner image from the photosensitive member to a sheet of plain paper. Thus, ozone is also produced mainly by such corona discharge units and thus the image forming apparatus becomes often filled with ozone after a relatively long period of operation. Since ozone would deteriorate the performance of the photosensitive member, it is preferable to remove the ozone produced within the housing of an image forming apparatus. For this purpose, an ozone removing device is often used in an image forming apparatus.

A typical prior art ozone removing device includes activated carbon or a metal oxide as an ozone decomposing agent. Such a prior art ozone decomposing agent is a solid material and it removes ozone by absorption. Thus, the prior art ozone decomposing agent becomes effective in removing ozone from the air once the ozone to be removed comes into contact with the ozone decomposing agent by drifting. In order to provide an enhanced rate of removal of ozone, it is required to dispose an ozone removing device as close as possible to a location where ozone is generated or to dispose an ozone removing device at a ventilation exit through which ozone is discharged. Another problem with the prior art ozone removing device is its relatively large size, which tends to inhibit to make the overall size of an image forming apparatus smaller.

In an image forming apparatus in which the provision of such an ozone removing device is desired, limited space makes it difficult to dispose an ozone removing device in the vicinity of an ozone-generating location. Besides, to dispose an ozone removing device at a ventilation exit would tend to increase the pressure drop, interfering with adequate ventilation inside of an imaging machine and causing an undesirable temperature rise inside of an image forming apparatus. In addition, the prior art ozone decomposing agent of activated carbon or a metal oxide is initially effective in removing ozone; however, its ozone removing capability radically drops due to aging. Thus, if it is desired to prolong the service life of the prior art ozone removing device, it is necessary to increase the amount of ozone decomposing agent to be used in an ozone removing device, which would again tend to make the entire device bulky in structure and high at cost.

SUMMARY OF THE INVENTION

In accordance with the principle of the present invention, there is provided an ozone removing device comprising a container for containing therein a quantity of a volatile ozone removing agent and control means for controlling the volatilization of the volatile ozone removing agent. In the preferred embodiment, the volatile ozone removing agent includes a mixture of terpenoid (general formula $C_mH_{2n+14}O_p$, m=9-15, n=0-4, p=0-2) as a main component and a glycol family material as an additive component. With an ozone removing device of the present invention, the volatile ozone removing agent is volatilized or vaporized so that the ozone removing agent is positively diffused into the surrounding atmosphere to thereby remove ozone wherever the diffusing ozone removing agent comes into contact therewith. In addition, because of the use of the volatilization controlling means for controlling the volatilization of the volatile ozone removing agent, the desired ozone removing characteristic can be obtained for a relatively long period of time without deterioration.

It is therefore a primary object of the present invention to obviate the disadvantages of the prior art as described above and to provide an improved ozone removing device suitable for use in an image forming apparatus.

Another object of the present invention is to provide an improved ozone removing device capable of providing an ozone removing characteristic for a relatively long period of time substantially without deterioration.

A further object of the present invention is to provide an improved ozone removing device which may be located at any desired location within an image forming apparatus for removing the ozone produced inside of the image forming apparatus.

A still further object of the present invention is to provide an improved ozone removing device high in efficiency and low at cost.

Other objects, advantages and novel features of the present invention will become apparent from the following detailed description of the invention when considered in conjunction with the accompanying drawings.

DESCRIPTION OF THE PREFERRED EMBODIMENTS

Figure 1:
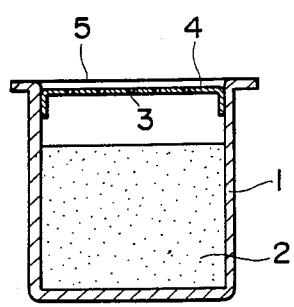
FIG. 1 is a schematic illustration showing in cross section an ozone removing device constructed in accordance with one embodiment of the present invention.

Referring now to FIG. 1, there is schematically shown an ozone removing device constructed in accordance with one embodiment of the present invention. As shown, the illustrated ozone removing device includes a container 1 of a synthetic resin material in any desired shape, such as circular, triangular and rectangular in cross section. The container 1 contains therein a quantity of a volatile ozone removing agent 2, and a filter 4 comprised of a thin plate formed with a plurality of through-holes 3 is attached to the mouth of the container 1. In the illustrated embodiment, an aluminum seal 5 is fixedly and sealingly attached to the filter 4 to thereby close all of the through-holes 3. In the preferred embodiment, the volatile ozone removing agent 2 includes a mixture of terpenoid (general formula: $C_mH_{2n+14}O_p$, m=9-15, n=0-4, p=0-2) as a main component and a glycol family material as an additive component. It is to be noted that the aluminum seal 5 must be removed at least partly when the present ozone removing device is set in an operative condition.

Since the ozone removing agent 2 contained in the container 1 is volatile, the volatilized ozone removing agent is diffused into the surrounding atmosphere to remove the ozone drifting in the air whereever it comes into contact therewith. Thus, the present ozone removing device is not limited in mounting location in an image forming apparatus and may be located at any convenient place. Since the volatilized ozone removing agent is discharged out of the container 1 through the holes 3 in the filter 3 by diffusion, the amount of volatilization of the ozone removing agent 2 may be controlled appropriately by designing the size and number of the holes 3. The amount of volatilization, i.e., amount of supply per unit time, of terpenoid into the surrounding atmosphere should be appropriately determined in consideration of various factors, such as the amount of generation of ozone in an image forming apparatus, temperature, humidity and flow rate of ventilation air. As an alternative embodiment, the filter 4 may be comprised of a porous plate instead of a solid thin plate formed with through-holes 3 as described above. In this alternative structure, the amount of volatilization or supply of terpenoid per unit time may be suitably controlled by controlling the thickness of such a porous plate.

As described briefly above, the aluminum seal 5 is preferably adhesively and sealing attached to the filter to close all of the holes 3 so as to prevent the volatile ozone removing agent 1 from being volatilized or vaporized into the surrounding air until the present ozone removing device is set in position inside of an image forming apparatus. After setting the present ozone removing device in position, when the aluminum seal 5 is removed, the volatile ozone removing agent 2 is diffused into the surrounding atmosphere by volatilization, whereby any ozone encountered is decomposed and removed. As an alternative structure, use may also be made of a cap or lid which is detachably and sealingly mounted on the container 1 at its mouth portion Such an alternative structure is advantageous because the holes 3 may be set closed or open by placing a cap or lid in position or removed at will, thereby allowing to prevent the volatile ozone removing agent 2 from being wasted. It may also be so structured to provide an electrical driving means, such as a solenoid, for attaching such a lid or cap to or removing it from the mouth of the container 1 so that the cap or lid is attached or removed automatically in response to an on/off operation of a main switch of an image forming apparatus.

The present ozone removing device may be located at any desired location inside of an image forming apparatus. In addition, the container 1 may take any desired shape such that it may be fitted into a desired space inside of an image forming apparatus.

Figure 2:
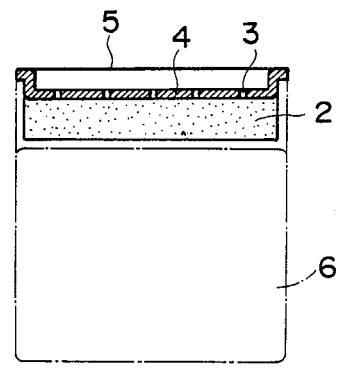
FIG. 2 is a schematic illustration showing in cross section an ozone removing device integral with a replaceable component constructed in accordance with another embodiment of the present invention.

FIG. 2 shows another embodiment of the present ozone removing device In this embodiment, the present ozone removing device constitutes a portion of any desired component, such as a toner cartridge, a photosensitive member, a cleaning unit or a corona discharging unit, in an integral format. In this embodiment, the amount of the volatile ozone removing agent 2 to be contained in the container 2 is preferably determined in consideration of the expected service life of the associated component. As shown in FIG. 2, the ozone removing device of the present embodiment having an integrated structure with an associated component is similar in essential structure to the previous embodiment shown in FIG. 1. The present embodiment is advantageous because when the associated component is replaced with a new one, there is also provided a new ozone removing device automatically.

Figure 3:
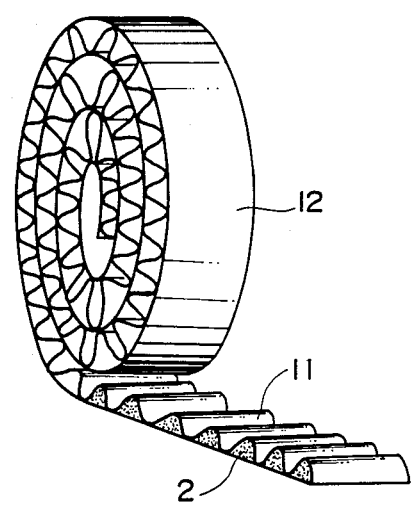
FIG. 3 is a schematic illustration showing in perspective view an ozone removing device defined in the form of tape constructed in accordance with a further embodiment of the present invention.

FIG. 3 illustrates a further embodiment of the present invention. The present ozone removing device includes a wavy tape 11 and a flat tape 12 which are adhesively put together, and a volatile ozone removing agent 2 is filled into each of the chambers defined between the wavy and flat tapes 11 and 12. And, a filter similar in structure to the filter 4 shown in FIGS. 1 and 2 is fixedly attached to one side or both sides of the combined tapes 11 and 12 so as to control the degree of volatilization of the volatile ozone removing agent 2. An aluminum seal similar to the aluminum seal 5 shown in FIGS. 1 and 2 may also be adhesively and sealingly attached to the filter. The present ozone removing tape may be adhesively attached to the wall or floor of the machine housing of an image forming apparatus, or it may be installed in a desired space of an image forming apparatus in the form of a roll as shown in FIG. 3. Thus, the present embodiment is particularly useful in making the overall size of an image forming apparatus smaller in size.

Any of the ozone removing devices of the present invention shown in FIGS. 1 through 3 may be located at an appropriate location inside of an image forming apparatus. For example, in the case of a copier or a laser printer using an electrophotographic process, since ozone is generated primarily from a corona discharge unit and the ozone thus generated flows toward a ventilation exit, it is preferable to place the present ozone removing device close to the origin of ozone generation or in a path of ventilating air flow.

Figure 4:
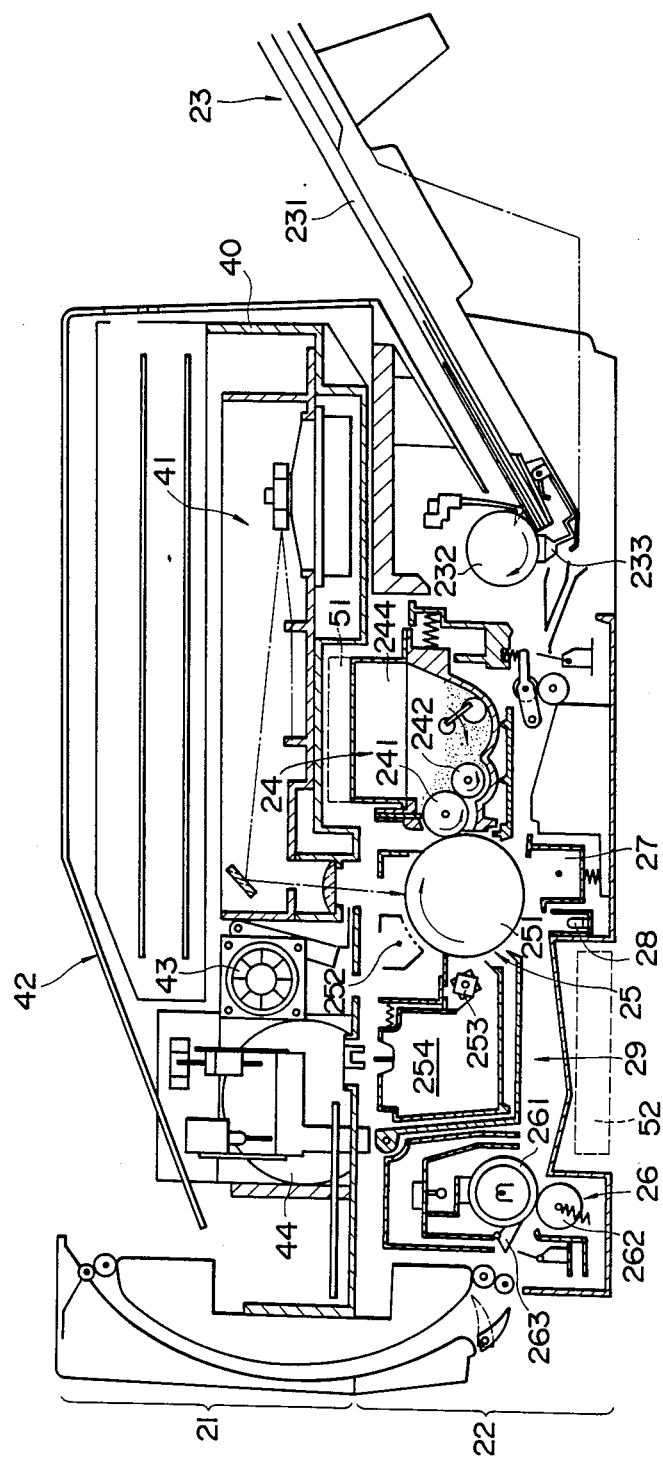
FIG. 4 is a schematic illustration showing the overall structure of a laser printer to which an ozone removing device of the present invention may be applied advantageously.

FIG. 4 illustrates the overall structure of a laser beam printer to which an ozone removing device embodying the present invention may be advantageously applied. As shown, the illustrated laser beam printer is generally divided into two sections, i.e., an upper half unit 21 and a lower half unit 22. The upper half unit 21 is pivoted to the lower half unit 22 at one end, and thus, the interior structure may be exposed by pivoting the upper half unit 21 up with respect to the lower half unit 22, so that replacement of disposable or replaceable components can be carried out with ease. In the illustrated example, the lower half unit 22 is provided with a paper feed tray 23, a developing device 24, a photosensitive unit 25 and an image fixing device 26.

Figure 5:
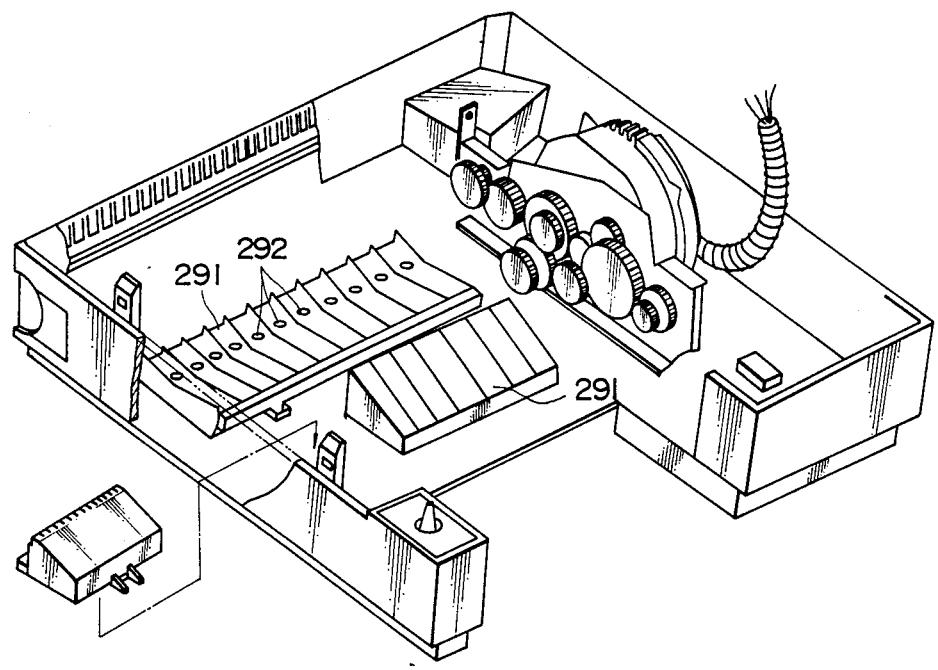
FIGS. 5 and 6 are schematic illustrations showing portions of the laser printer of FIG. 4 in detail on an enlarged scale.

The paper feed tray 23 is provided with a feed roller 232 for feeding a sheet of transfer paper 231 and also with a friction pad 233 which is in pressure contact with the paper feed roller 232. The developing device 24 includes a developing roller 241, a toner supply roller 242, a developing tank 243 and a toner cartridge 244. The photosensitive unit 25 includes a rotatably supported photosensitive drum 251, a charging corona unit 252, a toner collection roller 253 and a toner collection tank 254. Below the photosensitive drum 251 is disposed an image transferring corona unit 27 and a charge removing lamp 28. A paper transportation path 29 is defined below the toner collection tank 254. As shown in detail in FIG. 5, the paper transportation path 29 is provided with a plurality of ribs 291 extending in the direction of transportation of a sheet of transfer paper and also with a plurality of through holes 292 for allowing the passage of air flow therethrough. The image fixing unit 26 includes an image fixing roller 261 having provided therein an internal heater, a pressure roller 262 pressed against the image fixing roller 261 and a paper separating pawl 263 for separating a sheet of paper from the image fixing roller 261.

Figure 6:
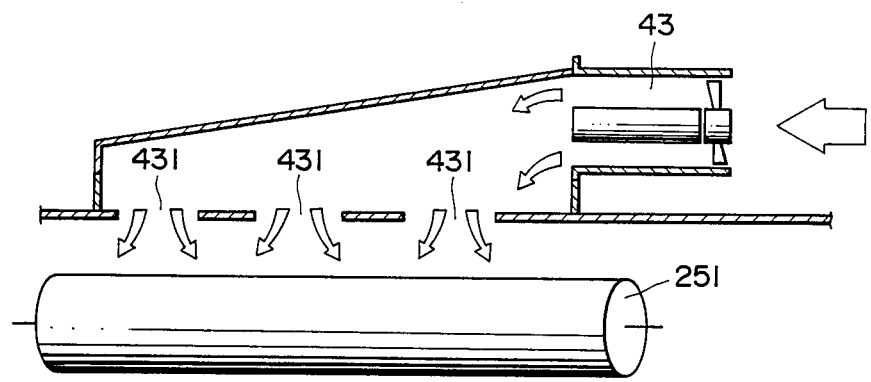

On the other hand, the printer upper half unit 21 is provided with a laser optical system 41 mounted on an upper unit frame 40, an upper paper discharge tray 42, an ozone transporting fan 43 and a ventilating or air discharging fan 44. The ozone transporting fan 43 is disposed above the charging corona unit 252 and is fixed in position as mounted generally at the center of the upper unit frame 40 of a synthetic resin material. As shown in FIG. 6, a plurality of through-holes 431 are formed in a bottom wall of the upper unit frame 40, so that the air driven by the ozone transporting fan 43 flows through the holes 431 in the direction indicated by the arrows and thus the air flowing through the holes 431 flow past the photosensitive drum 25 substantially uniformly along its axis. As a result, any ozone present in the vicinity of the photosensitive drum 251 is carried away from the drum 251, so that the drum 251 is kept from being deteriorated by the ozone. The ventilating fan 44 is disposed above the toner collection tank 254 and it serves to expel the air inside of the printer to be discharged.

A possible location for placing the present ozone removing device in the above-described laser printer includes a location 51 above the developing device 24, a location 52 below the paper transportation path 29, and a location 53 in front of the ventilating fan 44. Either of the ozone removing devices shown in FIGS. 1 and 3 may be provided at any of such locations. Thus, the particular shape of the present ozone removing device should be designed in consideration of the size and shape of the location in which it is disposed. With this structure, an ozone removing device may be advantageously provided without requiring changes in the overall structure of an image forming apparatus.

As described above, in accordance with the present invention, since use is made of a volatile ozone removing agent, there is virtually no locational limitation in its disposition, though there may be one or more preferred locations. In addition, since provision is made of volatilization controlling means, the removal of ozone may be carried out optimally and the ozone removing agent is prevented from being wasted.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. An ozone removing device comprising:
    a container for containing therein a quantity of volatile ozone removing agent; and
    controlling means for controlling the rate of volatilization of said volatile ozone removing agent; wherein said volatile ozone removing agent includes a mixture of terpenoid (general formula: $C_mH_{2n+14}O_p$, m=9-15, n=0-4, p=0-2) and a glycol family material.

2. The device of claim 1, wherein said container has a mouth and said controlling means includes a filter fixedly attached to said mouth of said container and formed with a plurality of through-holes.

3. The device of claim 2, wherein said controlling means further includes a seal member which is detachably and sealingly attached to said filter to normally close all of said through-holes.

4. The device of claim 1 and an apparatus having an ozone generating source and a replaceable component, wherein said container is integrally formed with said replaceable component of said apparatus having said ozone generating source.

5. The structure of claim 4, wherein said apparatus is an image forming apparatus selected from the group consisting of a copier, a laser printer and a facsimile machine, which uses an electrophotographic process.

6. The structure of claim 4 wherein the quantity of said volatile ozone removing agent contained in said container is determined in consideration of a service life of said integrated replaceable component.

7. The device of claim 1, wherein said container includes a pair of tapes which are combined together to define a plurality of chambers therebetween, which chambers are filled with said volatile ozone removing agent.

8. The device of claim 7, wherein one of said pair of tapes is a wavy tape and the other is a flat tape.

9. The device of claim 7, wherein said controlling means covers at least one end of each said chambers to thereby control the volatilization of said volatile ozone removing agent.

10. An apparatus having a housing which communicates with the ambient through apertures in said housing comprising:
    a device which is located inside the housing of said apparatus and generates ozone;
    a source which also is located inside the housing of said apparatus and produces a gaseous agent for removing said ozone, said source comprising a container containing therein a volatile material which produces said gaseous agent; and
    means for controlling the flow of said gaseous agent from said source into said apparatus, wherein said means comprises a filter disposed between said volatile agent and the interior of said apparatus.

11. An apparatus as in claim 10 in which said volatile material comprises a mixture of a terpenoid and a glycol family material.

12. An apparatus as in claim 11 in which said terpenoid has the general formula $C_mH_{2n+14}O_p$, where m=9-15, n=0-4 and p=0-2.

13. An apparatus as in claim 12 comprising a photoconductive member and wherein said device which generates ozone comprises a corona member operatively associated with said member.

14. An apparatus as in claim 13 in which said apparatus includes an operative member having a selected service life and said container is integrally formed with said operative member and contains a quantity of said volatile material related to said service life of the operative member.

15. An apparatus as in claim 14 in which said container is in the form of two tapes secured to each other to form a plurality of chambers for said volatile material.

* * * * *